(12) United States Patent
Yoon et al.

(10) Patent No.: US 11,864,495 B2
(45) Date of Patent: Jan. 9, 2024

(54) ROBOT LAWNMOWER

(71) Applicant: Samsung Electronics Co., Ltd., Suwon-si (KR)

(72) Inventors: Jinwook Yoon, Suwon-si (KR); Hyunki Bae, Suwon-si (KR); Hyunkoo Kang, Suwon-si (KR); Taegyu Kim, Suwon-si (KR); Wonyoung Seo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 282 days.

(21) Appl. No.: 17/203,563

(22) Filed: Mar. 16, 2021

(65) Prior Publication Data

US 2021/0282322 A1  Sep. 16, 2021

(30) Foreign Application Priority Data

Mar. 16, 2020 (KR) .......................... 10-2020-0031888

(51) Int. Cl.
| | |
|---|---|
| *A01D 43/16* | (2006.01) |
| *A01D 34/56* | (2006.01) |
| *A01D 101/00* | (2006.01) |
| *A01D 34/00* | (2006.01) |

(52) U.S. Cl.
CPC .......... *A01D 43/16* (2013.01); *A01D 34/008* (2013.01); *A01D 34/56* (2013.01); *A01D 2101/00* (2013.01)

(58) Field of Classification Search
CPC ...... A01D 43/16; A01D 34/008; A01D 34/56; A01D 2101/00
USPC .......................................................... 56/16.7
See application file for complete search history.

(56) References Cited

U.S. PATENT DOCUMENTS

| | | |
|---|---|---|
| 6,701,700 B2 | 3/2004 | Keane |
| 9,144,196 B2 | 9/2015 | Francis |
| 2010/0324731 A1* | 12/2010 | Letsky ................. G05D 1/0274 901/1 |
| 2019/0223376 A1 | 7/2019 | Lee et al. |

FOREIGN PATENT DOCUMENTS

| | | | |
|---|---|---|---|
| EP | 2 547 193 B1 | 3/2017 | |
| GB | 2417665 A * | 3/2006 | ............. A01D 43/16 |
| KR | 10-1984926 B1 | 5/2019 | |

* cited by examiner

*Primary Examiner* — Mahmoud Gimie

(57) ABSTRACT

Disclosed is a robot lawnmower including a body frame, a main wheel disposed on both sides of the body frame, a motor to drive the main wheel, a first edge blade provided in a region of the body frame corresponding to the main wheel and coupled to be rotatable with respect to the body frame by receiving a driving force of the motor, and a second edge blade disposed between the body frame and the main wheel to rotate together with the main wheel and cut a grass by a relative rotation of the first edge blade and the main wheel.

20 Claims, 11 Drawing Sheets

ROBOT LAWNMOWER

CROSS-REFERENCE TO RELATED APPLICATIONS

This application is based on and claims priority under 35 U.S.C. § 119 to Korean Patent Application No. 10-2020-0031888 filed on Mar. 16, 2020 in the Korean Intellectual Property Office, the disclosure of which is incorporated by reference herein in its entirety.

BACKGROUND

1. Field

The disclosure relates to a robot lawnmower that mows a lawn with a blade driven by a motor.

2. Description of the Related Art

A lawnmower is a device that landscapes a garden, yard, lawn playground, or golf course.

In recent years, an automated robot-type lawnmower is being developed that allows a lawnmower to conduct landscaping on its own by applying autonomous driving technology instead of running the lawnmower directly by a user.

A lawnmower is driven by a plurality of wheels disposed on both sides of a main body and a motor driving the same, and may landscape by mowing the grass in a specific place by a blade disposed at a lower end of the main body.

The blade disposed at the lower end of the main body rotates and cuts an upper part of the grass. A width at which the grass is cut may be formed as a diameter of a cut region formed when the blade is rotated. In this case, a region that may not be cut may occur to the left or right of the cut region. Therefore, the number of round trips a robot lawnmower must travel to cut the grass in a specific region increases, thereby increasing the working time. In addition, although a structure to increase the diameter of the cut region described above may be adopted, the risk of a safety accident may increase for the user.

SUMMARY

It is an aspect of the disclosure to provide a robot lawnmower with an improved structure capable of simultaneously cutting grass in a rim region located on both sides of a main cut region.

Additional aspects of the disclosure will be set forth in part in the description which follows and, in part, will be obvious from the description, or may be learned by practice of the disclosure.

In accordance with an aspect of the disclosure, a robot lawnmower includes a body frame, a main wheel disposed on both sides of the body frame, a motor to drive the main wheel, a first edge blade provided in a region of the body frame corresponding to the main wheel and coupled to be rotatable with respect to the body frame by receiving a driving force of the motor, and a second edge blade disposed between the body frame and the main wheel to rotate together with the main wheel and cut a grass by a relative rotation of the first edge blade and the main wheel.

The first edge blade may include a ring gear rotatable with respect to the body frame.

The ring gear may include a ring gear groove formed on an outer circumferential surface thereof, and the body frame may include a mounting part coupled to the ring gear groove to rotatably support the ring gear.

The robot lawnmower may further include a first motor to rotate the main wheel and a main wheel driving shaft to connect the first motor and the main wheel, wherein a sun gear may be formed on an outer circumferential surface of the main wheel driving shaft.

The robot lawnmower may further include a planetary gear engaged between the sun gear and the ring gear to rotate.

The ring gear and the main wheel may rotate in opposite directions.

The robot lawnmower may further include a planetary gear box formed on the inside of the body frame and to which a planetary gear rotation shaft extending from the planetary gear is rotatably coupled.

The first edge blade may include a plurality of first protruding edges protruding from a rim of the ring gear toward the main wheel.

The second edge blade may include a plurality of second protruding edges formed along a rim of the main wheel to correspond to the first edge blade and protruding from an inner rim of the main wheel toward the body frame.

The plurality of first protruding edges and the plurality of second protruding edges may protrude in a direction parallel to a rotation shaft of the main wheel.

Each of the plurality of first protruding edges may include a first inclined surface.

Each of the plurality of second protruding edges may include a second inclined surface spaced apart from and facing the first inclined surface.

The plurality of first protruding edges may be formed to be spaced apart from each other along the rim of the ring gear, and the plurality of second protruding edges each may correspond to the plurality of first protruding edges and may be formed to be spaced apart from each other along the rim of the main wheel.

A plurality of the main wheels may be provided to be disposed on both sides of the body frame, the robot lawnmower may further include a main blade disposed between the plurality of main wheels and rotatably provided on a bottom of the body frame, and a second motor fixed to the body frame to rotate the main blade, and the main blade may include a rotating plate coupled to the second motor and to rotate, and a plurality of blades protruding from a rim of the rotating plate.

The robot lawnmower may further include a first region in which a grass is cut by the main blade, and a second region adjacent to both sides of the first region and in which the grass is cut by the first edge blade and the second edge blade.

In accordance with an aspect of the disclosure, a robot lawnmower includes a body frame on which a main wheel is disposed on both sides thereof, a first edge blade including a plurality of first protruding edges protruding from the body frame toward the main wheel, and a second edge blade formed along a rim of the main wheel and including a plurality of second protruding edges protruding from the main wheel toward the body frame to correspond to the first edge blade.

The first edge blade may include a ring gear rotatable with respect to the body frame, the plurality of first protruding edges may protrude from a rim of the ring gear, the ring gear may include a ring gear groove formed on an outer circumferential surface thereof, and the body frame may include a mounting part coupled to the ring gear groove to rotatably support the ring gear.

The plurality of first protruding edges may each be spaced apart from each other to be disposed along the rim of the ring gear and may each include a first inclined surface, and the plurality of second protruding edges may be spaced apart from each other to correspond to the plurality of first protruding edges and to be disposed along the rim of the main wheel, and may each include a second inclined surface spaced apart from and facing the first inclined surface.

The robot lawnmower may further include a motor to rotate the main wheel, a main wheel driving shaft connecting the motor and the main wheel and including a sun gear formed on an outer circumferential surface thereof, and a planetary gear engaged between the main wheel driving shaft and the ring gear to rotate.

The robot lawnmower may further include a planetary gear box formed on the inside of the body frame so that the ring gear and the main wheel rotate in opposite directions and to which a planetary gear rotation shaft extending from the planetary gear is rotatably coupled.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Configurations shown in the embodiments and the drawings described in the present specification are only the preferred embodiments of the present disclosure, and thus it is to be understood that various modified examples, which may replace the embodiments and the drawings described in the present specification, are possible when filing the present application.

Like reference numbers or signs in the various figures of the application represent parts or components that perform substantially the same functions.

The terms used herein are for the purpose of describing the embodiments and are not intended to restrict and/or to limit the disclosure. For example, the singular expressions herein may include plural expressions, unless the context clearly dictates otherwise. Also, the terms "comprises" and "has" are intended to indicate that there are features, numbers, steps, operations, elements, parts, or combinations thereof described in the specification, and do not exclude the presence or addition of one or more other features, numbers, steps, operations, elements, parts, or combinations thereof.

It will be understood that although the terms first, second, etc. may be used herein to describe various components, these components should not be limited by these terms, and the terms are only used to distinguish one component from another. For example, without departing from the scope of the disclosure, the first component may be referred to as a second component, and similarly, the second component may also be referred to as a first component. The term "and/or" includes any combination of a plurality of related items or any one of a plurality of related items.

The terms "front end," "rear end," "upper portion," "lower portion," "upper end" and "lower end" used in the following description are defined with reference to the drawings, and the shape and position of each component are not limited by these terms.

Hereinafter, embodiments of the disclosure will be described in detail with reference to the accompanying drawings.

Figure 1:
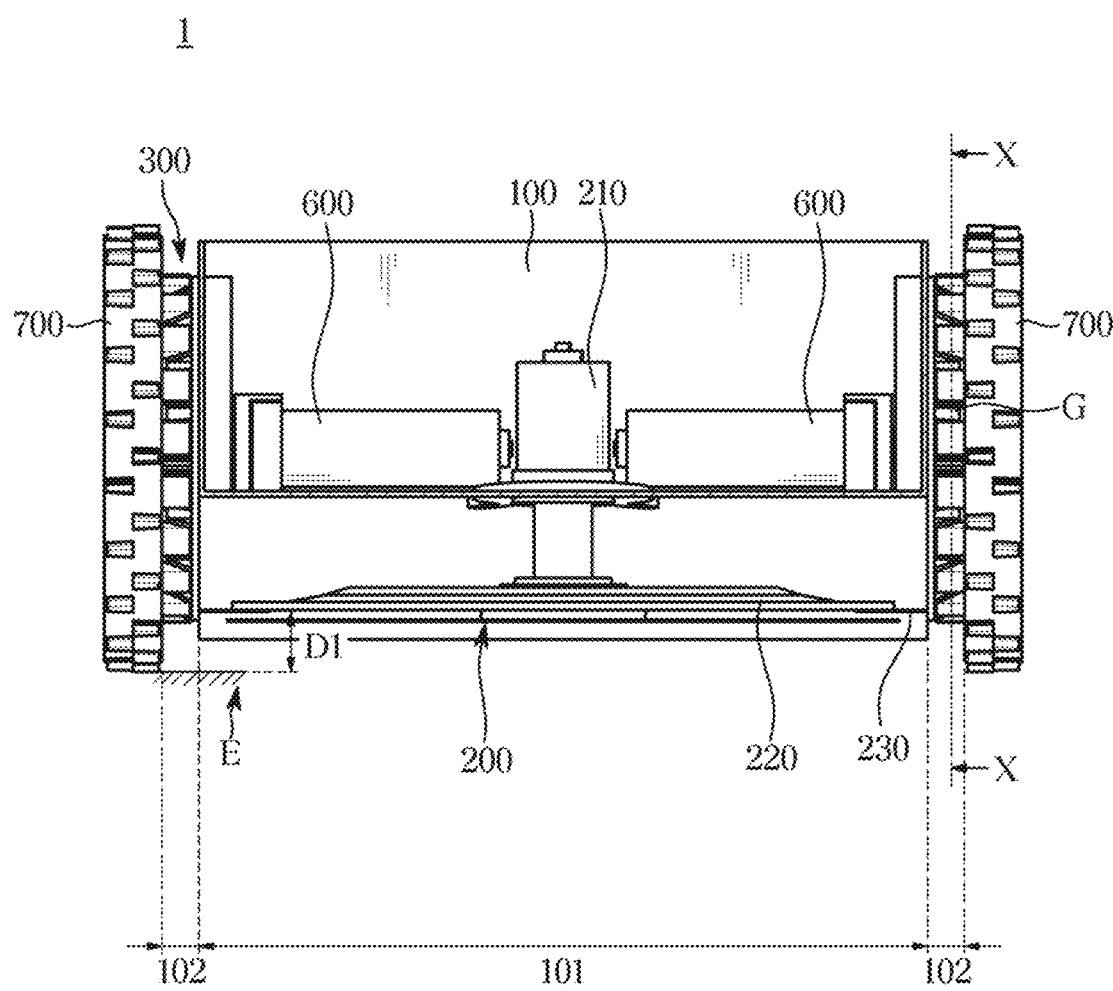
FIG. 1 is a front view of a robot lawnmower according to an embodiment with an auxiliary wheel and a front-line wall of a body frame removed.
Figure 2:
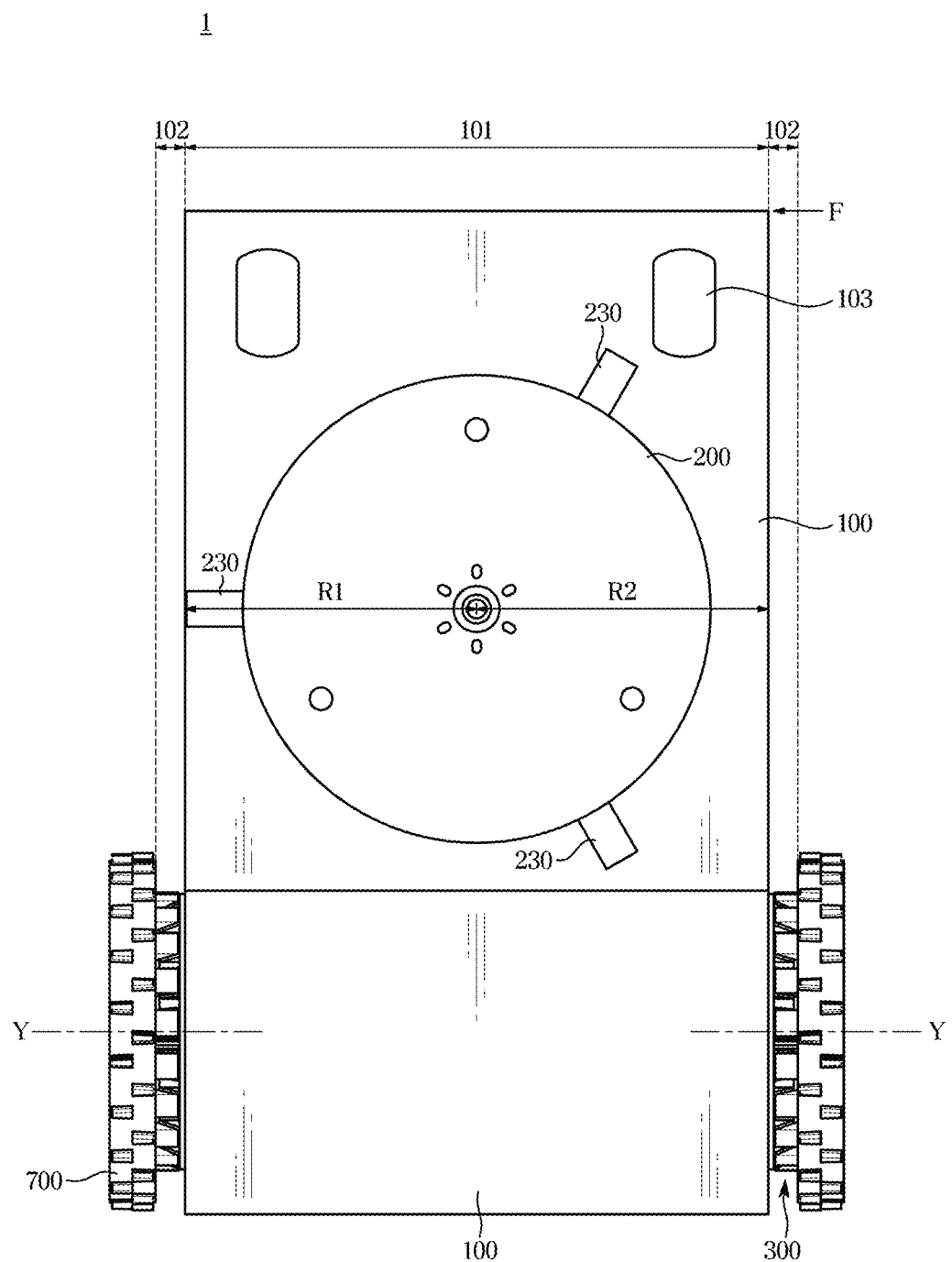
FIG. 2 is a view illustrating a lower portion of the robot lawnmower according to an embodiment.

FIG. 1 is a front view of a robot lawnmower 1 according to an embodiment with an auxiliary wheel 103 and a front-line wall of a body frame 100 removed, and FIG. 2 is a view illustrating a lower portion of the robot lawnmower 1 according to an embodiment. For reference, the meaning of removing a front-line wall of the body frame 100 means that a wall disposed on an F side is removed when FIG. 2 is referred.

The robot lawnmower 1 according to an embodiment of the disclosure may include the body frame 100, a housing (not shown), a main wheel 700, a first motor 600, and a second motor 210.

Specifically, the body frame 100 may be provided in a substantially box shape as illustrated in FIGS. 1 and 2. Alternatively, in addition to the box shape, various shapes may be provided in consideration of an arrangement region of the main wheel 700 and an arrangement of an edge cutting structure 10, which will be described later. In addition, a frame formed of a bar, that is, a frame having a bone structure, not a frame formed of a surface may be provided.

In the case of a region in which the main wheel 700 is disposed, a step may be formed in consideration of installation with a first edge blade 400, which will be described later. That is, a bottom of the body frame 100 in a region where the first edge blade 400 is installed may be formed at a lower position than the bottom of the body frame 100 in a region where the first edge blade 400 is not installed.

A housing (not shown) may form an appearance of the robot lawnmower 1. An inner surface of the housing (not shown) may be formed according to the shape of the body frame 100. The appearance of the robot lawnmower 1 may be generally formed in a shape similar to a vehicle. That is, the robot lawnmower 1 may be formed in a semicircle shape provided in an overall streamlined shape when viewed from a side of the robot lawnmower 1. The housing (not shown) may be provided to be coupled to the body frame 100 at an upper portion of the body frame 100. The housing (not shown) may be provided to surround the upper portion of the body frame 100.

The main wheel 700 may be disposed on a side of the body frame 100 to be rotatably mounted on the body frame 100. A plurality of the main wheels 700 may be provided and disposed on opposite sides of the main frame 100.

Due to the nature of a work space of the robot lawnmower 1, the robot lawnmower 1 mainly runs on an uneven terrain such as a lawn, not a flat terrain such as asphalt. Accordingly, the main wheel 700 may include a plurality of protrusions 701 formed in a portion in contact with the ground. As illustrated in FIG. 1, when a surface in contact with the ground is divided into two regions the plurality of protrusions 701 may be formed to protrude from each region in a zigzag manner. However, the plurality of protrusions 701 is not limited to the above formation manner, and the protrusions 701 may be formed in various shapes that may maximize friction on an uneven terrain and secure driving accuracy.

The main wheel 700 is disposed inside the body frame 100 and may be connected to the first motor 600 fixed to the body frame 100. In response to the plurality of main wheels 700, a plurality of the first motors 600 may also be provided. That is, the one first motor 600 may be provided to correspond to the one main wheel 700. A main wheel driving shaft 610 extending from the first motor 600 may be inserted into and fixed to a main wheel driving shaft insertion groove 710 formed in a rotation center of the main wheel 700.

The plurality of first motors 600 may be independently controlled to be rotatable at different rotational speeds. Along with providing a driving force for the driving of the robot lawnmower 1, revolving numbers of the plurality of first motors may be adjusted by a controller (not shown), and a driving direction may be adjusted by a difference between the revolving numbers of the main wheel 700.

The robot lawnmower 1 according to an embodiment of the disclosure may further include an auxiliary wheel 103.

The auxiliary wheel 103 may be installed at a front lower portion of the body frame 100. The auxiliary wheels 103 may be disposed to be spaced apart in a width direction of the body frame 100. The auxiliary wheels 103 may be connected to a shaft (not shown) rotatably coupled to the body frame 100. Each of the auxiliary wheels 103 may be mounted to be rotatable about the shaft. FIG. 2 illustrates two of the auxiliary wheels 103, but the number of the auxiliary wheels 103 is not limited thereto, and the auxiliary wheel 103 may be provided in various manners capable of assisting the driving of the main wheel 700.

The robot lawnmower 1 according to an embodiment of the disclosure may further include a main blade 200 and the second motor 210 driving the main blade 200.

Referring to FIG. 2, the second motor 210 may be disposed on the bottom of the body frame 100 in a region where the first edge blade 400 is not installed. The second motor 210 is fixed to the body frame 100 and may generate a driving force to rotate the main blade 200. In summary, the plurality of first motors 600 may be provided on the body frame 100 in a region in which the first edge blade 400 is installed to generate a driving force to rotate the main wheel 700, and the second motor 210 may be provided on the bottom of the body frame 100 in a region where the first edge blade 400 is not installed to generate a driving force to rotate the main blade 200.

Referring to FIGS. 1 and 2, the main blade 200 may include a rotating plate 220 and a plurality of blades 230.

The rotating plate 220 may be formed in a circular plate. The rotating plate 220 may be coupled to a main blade driving shaft (not shown) extending from the second motor 210 fixed to the body frame 100. The rotating plate 220 is coupled to the main blade driving shaft (not shown), so that a driving force for rotating the main blade 200 of the second motor 210 may be transmitted.

The plurality of blades 230 may be rotatably and detachably coupled to a rim region of the rotating plate 220. Because the plurality of blades 230 is rotatably coupled to the rotating plate 220, when the rotating plate 220 rotates at a high speed by the second motor 210, each of the plurality of blades 230 may be disposed such that an extension direction thereof is parallel to a rotational radial direction of the rotating plate 220 by centrifugal force.

The reason why the plurality of blades 230 is rotatably and detachably coupled to the rim region of the rotating plate 220 is to ensure the durability of the main blade 200 by buffering impacts in a process of cutting by colliding with an object to be cut and the plurality of blades 230, and to enable replacement of the plurality of blades 230 consumed in the cutting process for a long time.

Although not shown in the drawings, the rotating plate 220 may be rotated by being coupled to the main blade driving shaft (not shown) extending from the second motor 210. In this case, referring to FIG. 1, a predetermined spaced distance D1 (hereinafter, referred to as a main spaced distance) may be formed between the main blade 200 and the ground. However, the main spaced distance D1 may not be fixed, but may be adjustable by ascending and descending operations of the main blade 200.

Although not shown in the drawings, in order to match a height of a cut grass in a first region 101 with a height of a cut grass in a second region 102 in response to a change in the main spaced distance D1, the main wheel 700 may be additionally provided with a structure in which a diameter of the main wheel 700 may be adjusted. When a material of the main wheel 700 is formed of an elastic body, the diameter of the main wheel 700 may be adjusted in a manner of increasing a volume of the elastic body of the main wheel 700. Alternatively, protrusion lengths of the plurality of protrusions 701 formed on the main wheel 700 may be provided in a structure capable of expanding and contracting.

The cut region of the robot lawnmower 1 according to an embodiment of the disclosure may be divided into the first region 101 and the second region 102.

Referring to FIGS. 1 and 2, when the rotating plate 220 rotates at a high speed by the second motor 210 from a rotation center of the main blade 200, a distance R1 to an end of the plurality of blades 230 from the rotation center of the main blade 200 in a rotational radial direction may be formed to be equal to a distance R2 between the rotation center of the main blade 200 and a side of the body frame 100.

Accordingly, a cut region formed by the main blade 200 as the rotating plate 220 rotates at a high speed may be referred to as a region corresponding to a width of the body frame 100 and may be defined as the first region 101.

The second regions located on both sides of the first region 101 may be defined. Specifically, the main wheel 700 may be disposed on a side of the body frame 100. A region in which a space spaced apart between the side portion of the body frame 100 and the main wheel 700 may be defined as a second region 102. A region formed by a space spaced apart between the side of the body frame 100 and the main wheel 700 may be defined as the second region 102.

A conventional robot lawnmower or a lawnmower may cut only a region similar to the first region 101. That is, only a region in which the main blade disposed on the bottom of the lawnmower runs may be cut and both sides of the region in which the main blade runs may not be cut, so that a separate trimming work is required.

A structure of increasing the distance R1 described above in order to secure the first region 101 more widely may be adopted, but the risk of a user's safety accident may increase.

Hereinafter, an edge cutting structure 10 for cutting a grass in the second region 102 will be described in detail.

Figure 3:
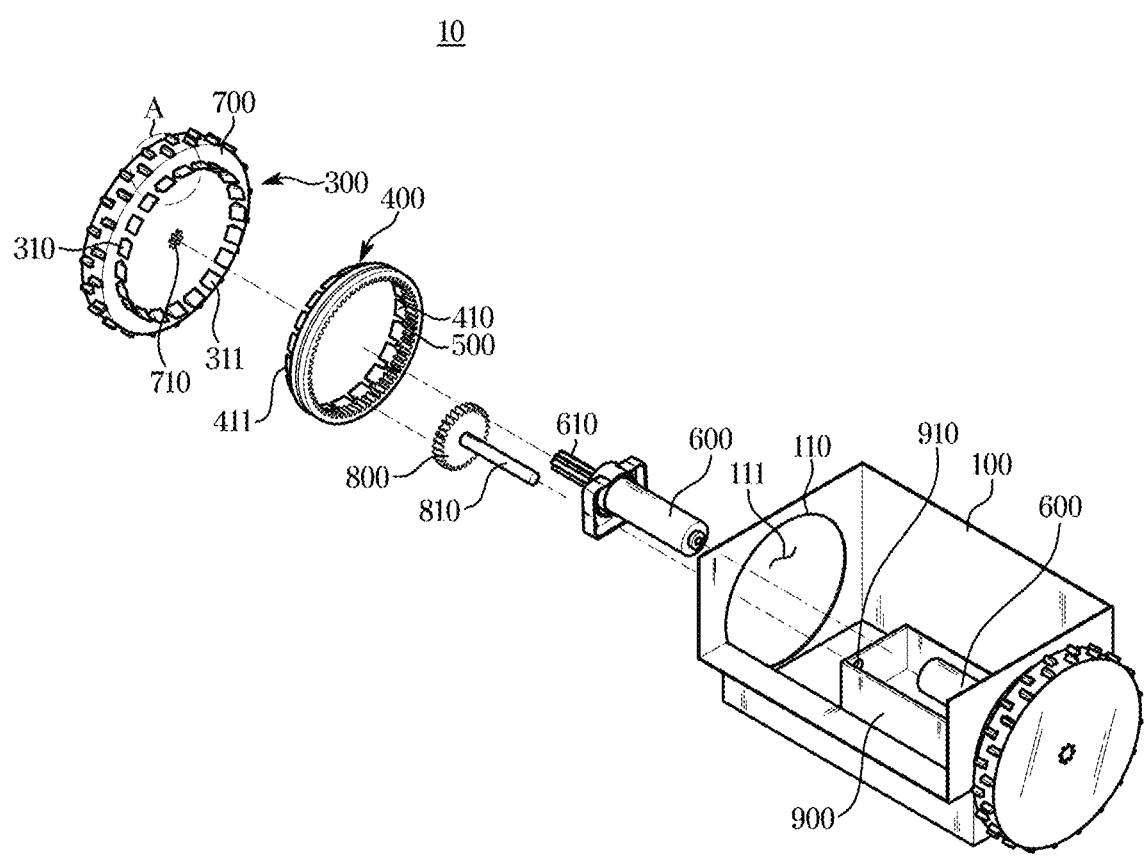
FIG. 3 is an exploded perspective view of an edge cutting structure viewed from one side of the robot lawnmower according to an embodiment.
Figure 4:
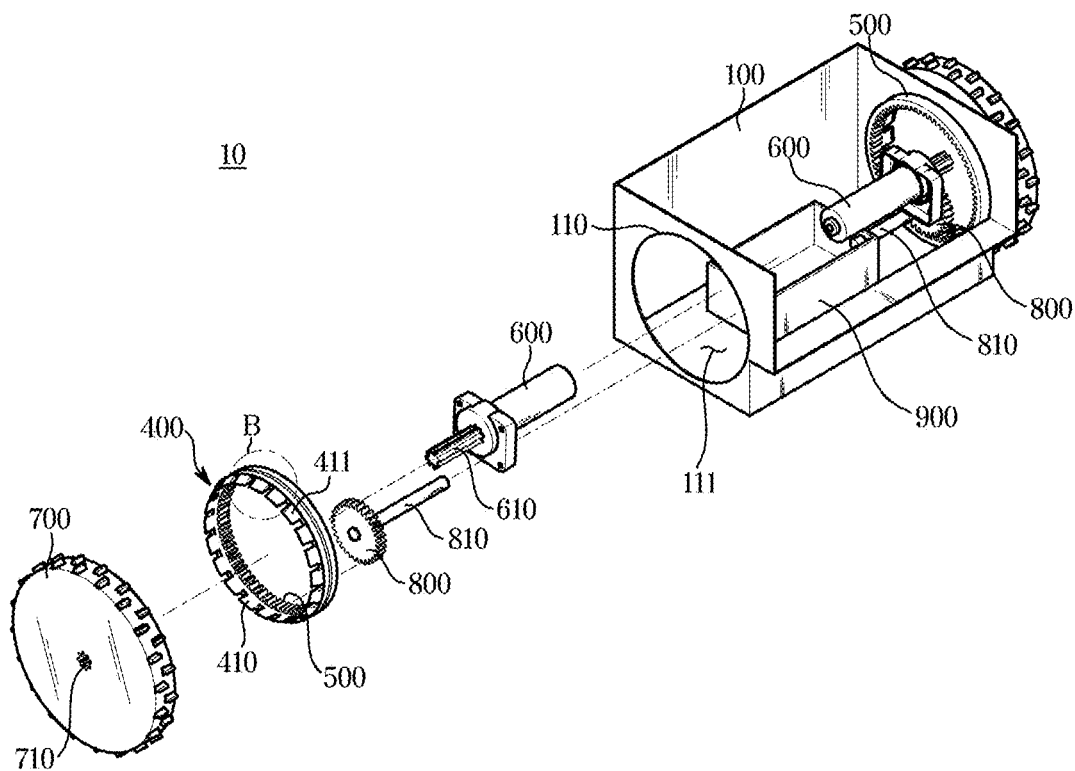
FIG. 4 is an exploded perspective view viewed from a different side from FIG. 3.

FIG. 3 is an exploded perspective view of the edge cutting structure 10 viewed from one side of the robot lawnmower 1 according to an embodiment, and FIG. 4 is an exploded perspective view viewed from a different side from FIG. 3.

The edge cutting structure 10 may include the first edge blade 400 and a second edge blade 300. The edge cutting structure 10 may be provided to cut a grass in the second region 102.

Hereinafter, the first edge blade 400 will be described.

The first edge blade 400 may include a ring gear 500 and a plurality of first protruding edges 410.

The ring gear 500 may be provided as an internal gear in which gear teeth are formed on the inside of a ring structure in which a hollow is provided in the center. Details of the ring structure and internal gear will be described later.

Because the first edge blade 400 cuts a grass in the second region 102 through a relative rotational motion with the second edge blade 300, which will be described later, the first edge blade 400 needs to be rotatably coupled to the body frame 100. Accordingly, a structure for rotatably coupling the ring gear 500 of the first edge blade 400 to the body frame 100 may be provided in the ring gear 500 and the body frame 100.

Specifically, in order for the second edge blade 300 to be rotatably coupled to the body frame 100, a ring gear groove 510 may be formed on the ring gear 500 of the second edge blade 300. Also, the body frame 100 may be provided with a mounting part 110 in a region in which the second edge blade 300 is coupled.

Hereinafter, the mounting part 110 and the ring gear groove 510 will be described. The mounting part 110 is formed on the body frame 100, not on the first edge blade 400, but will be described together with the ring gear groove 510 for convenience of description.

The mounting part 110 may be formed in the form of a hollow 111 having a diameter corresponding to the size of a diameter of the ring gear 500 on the side of the body frame 100 on which the main wheel 700 is disposed. Specifically, an inner edge forming the hollow 111 may be provided as the mounting part 110. The ring gear 500 is located in the hollow 111 of the mounting part 110, and the mounting part 110 is inserted into the ring gear groove 510, which will be described later, so that the ring gear 500 may be rotatably coupled to the body frame 100. That is, the mounting part 110 may support the ring gear 500 to be rotatable with respect to the body frame 100.

However, although in the robot lawnmower 1 according to an embodiment of the disclosure, the body frame 100 is provided in a box-shaped structure composed of surfaces so that the mounting part 110 is provided in the form of a hollow 111, as described above, in the case of a frame formed of a bar, that is, a frame having a bone structure, the mounting part 110 may be provided in a different form.

The ring gear groove 510 may be formed on an outer circumferential surface of the ring gear 500. Specifically, the ring gear groove 510 may be provided in a manner of forming an outer diameter groove on the ring gear 500. In this case, a width of the ring gear groove 510 may be formed to correspond to a thickness of the mounting part 110. A depth of the ring gear groove 510 may be formed such that the first edge blade 400 is not separated when rotated after the mounting part 110 is inserted.

It may be appropriate that the ring gear groove 510 is formed along a middle region of the outer circumferential surface of the ring gear 500. However, the formation position of the ring gear groove 510 is not limited to being formed in the middle region of the outer circumferential surface of the ring gear 500, and as will be described later, the ring gear groove 510 may be formed at different positions on the outer circumferential surface of the ring gear 500 according to the shape and size of a plurality of second protruding edges 310 cutting a grass in the second region 102.

The mounting part 110 is inserted into the ring gear groove 510 so that the first edge blade 400, specifically, the ring gear 500 may be rotatably coupled with respect to the body frame 100. The first edge blade 400 may be rotated with respect to the body frame 100 by receiving a driving force of the first motor 600 by a planetary gear structure, which will be described later.

Figure 10:
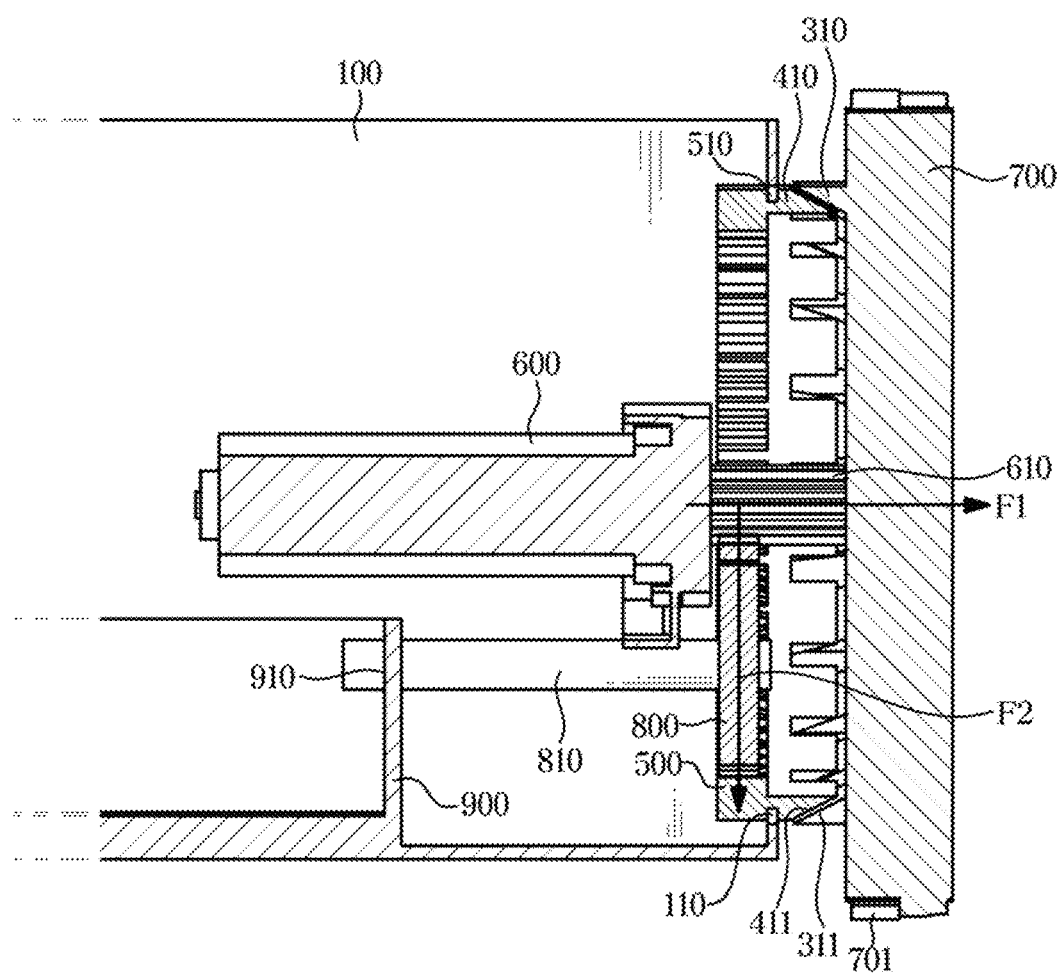
FIG. 10 is a cross-sectional view of line Y-Y in FIG. 2.

Although not shown in FIGS. 2, 3 and 10, a ball bearing may be provided between the ring gear groove 510 and the mounting part 110. As the ball bearing is provided, friction between the ring gear groove 510 and the mounting part 110 decreases, so that the first edge blade 400 may rotate smoothly, and at the same time, the durability of the edge cutting structure 10 may be improved.

Hereinafter, a ring structure of the ring gear 500 and the plurality of first protruding edges 410 will be described.

The diameter of the ring gear 500 may be formed smaller than the diameter of the main wheel 700. The diameter of the ring gear 500 refers to a diameter from a rotation center of the ring gear 500 to the outermost edge of the ring gear 500. Specifically, the ring gear 500 needs to be formed with a diameter capable of cutting a grass at a height similar to that of the main blade 200.

Referring to FIG. 1, a height at which the main blade 200 cuts a grass is shown as D1. That is, a distance in which the main blade 200 is spaced apart from the ground may be provided as a main spaced distance D1. Therefore, the diameter of the ring gear 500 may be provided as a length obtained by subtracting twice the length of the main spaced distance D1 of the main blade 200 from the ground from the length of the diameter of the main wheel 700.

Because the ring gear 500 is provided in a shape in which the center of a disk is open, that is, a shape having a hollow, the ring gear 500 may be provided in a ring shape having a predetermined thickness. The predetermined thickness may be set in consideration of the number of rotations in consideration of a gear ratio between the ring gear 500, a planetary gear 800, and a sun gear, which will be described later, or the shape of the plurality of first protruding edges 410.

An internal gear may be formed on an inner circumferential surface forming a hollow of the ring gear 500. The internal gear may be formed as a spur gear. Alternatively, the internal gear may be provided as a helical gear or a double helical gear in which a teeth line is formed in an oblique or curved line in consideration of improving durability of the gear and reducing noise. Also, the sun gear and the planetary gear 800, which will be described later, may be provided as gears of the same type to correspond to the shape of the teeth line of the inner gear of the ring gear 500.

In order to cut a grass in the second region 102 by a transmitted driving force, the first edge blade 400 may include a plurality of first protruding edges 410. The cutting of the grass in the second region 102 is performed by the plurality of first protruding edges 410 and the plurality of second protruding edges 310. However, hereinafter, only a structure of the plurality of first protruding edges 410 will be schematically described.

As described above, the first edge blade 400 is mainly composed of the ring gear 500 and the plurality of first protruding edges 410. The plurality of first protruding edges 410 may protrude from the ring gear 500 toward the main wheel 700 as illustrated in FIGS. 3 and 4. That is, the plurality of first protruding edges 410 may protrude from the body frame 100 in a direction of directing to the main wheel 700. A direction in which the plurality of first protruding edges 410 of the first edge blade 400 protrudes may be a direction substantially parallel to a rotation shaft of the main wheel 700.

Specifically, the plurality of first protruding edges 410 may protrude toward the main wheel 700 from a rim surface formed to face the main wheel 700 among rim surfaces of the ring gear 500. Hereinafter, a rim of the ring gear may be used to refer to the rim surface of the ring gear. The rim surface may be defined as the following structure.

As described above, the ring gear 500 includes the outer circumferential surface in which the ring gear groove 510 is formed and the inner circumferential surface in which the internal gear is formed. In this case, two of the rim surfaces connecting the outer circumferential surface and the inner circumferential surface may be formed on both sides of the ring gear 500. The plurality of first protruding edges 410 may protrude toward the main wheel 700 from a rim surface formed to face the main wheel 700 among the two rim surfaces.

The plurality of first protruding edges 410 may repeatedly protrude while having a predetermined width D2 and a predetermined spaced distance D3 along a formation direction of the rim surface, that is, a circumferential direction of the ring gear 500. Details of the shape and arrangement of the plurality of first protruding edges 410 and a structural relationship between the plurality of second protruding edges 310 will be described later.

Hereinafter, the second edge blade 300 will be described.

The second edge blade 300 may include the plurality of second protruding edges 310. Alternatively, the second edge blade 300 may be defined as including both the main wheel 700 and the plurality of second protruding edges 310. The plurality of second protruding edges 310 may protrude from the main wheel 700. In this case, the second edge blade 300 may protrude from the main wheel 700 in a direction of directing to the body frame 100. A direction in which the plurality of second protruding edges 310 of the second edge blade 300 protrudes may be a direction substantially parallel to the rotation shaft of the main wheel 700.

The arrangement and shape of the main wheel 700 are the same as described above.

The second edge blade 300 may be provided to cut a grass in the second region 102 through a relative rotational motion with the first edge blade 400 described above. In other words, rotation directions of the ring gear 500 and the main wheel 700 may be opposite to each other. The relative rotational motion refers to a rotational motion in which the rotational direction of the second edge blade 300 and the rotational direction of the first edge blade 400 are opposite and the rotational angular speeds are different.

The first edge blade 400 may be rotated by directly transmitting a driving force generated from the first motor 600 to the main wheel 700 through the main wheel driving shaft 610. The main wheel driving shaft insertion groove 710 may be formed on the main wheel 700 so that the driving force generated from the first motor 600 is directly transmitted to the main wheel 700 through the main wheel driving shaft 610. Apart from driving the first edge blade 400 by the driving force of the first motor 600 by inserting the main wheel driving shaft 610 into the main wheel driving shaft insertion groove 710, the driving force of the first motor 600 may directly rotate the second edge blade 300, that is, the main wheel 700. When the main wheel 700 is rotated, the second edge blade 300, that is, the plurality of second protruding edges 310 protruding from the main wheel 700 may be rotated together.

The second edge blade 300 may include the plurality of second protruding edges 310 in order to cut the grass in the second region 102 by the transmitted driving force. The cutting of the grass in the second region 102 is performed by the plurality of second protruding edges 310 together with the plurality of first protruding edges 410. However, hereinafter, only a structure of the plurality of second protruding edges 310 will be schematically described.

The plurality of second protruding edges 310 may protrude from the main wheel 700 toward the body frame 100 as illustrated in FIGS. 3 and 4.

Specifically, the plurality of second protruding edges 310 may protrude toward the body frame 100 from a side surface formed to face the body frame 100 among side surfaces of the main wheel 700. In this case, the side surface formed to face the body frame 100 among the side surfaces of the main wheel 700 may be referred to as an inner side surface of the main wheel 700. In other words, the plurality of second protruding edges 310 may protrude toward the body frame 100 from the inner surface of the main wheel 700.

The second edge blade 300 may be formed along a rim of the main wheel 700 to correspond to the first edge blade 400. Specifically, the plurality of second protruding edges 310 of the second edge blade 300 may be formed to correspond to the plurality of first protruding edges 410 of the first edge blade 400.

As described above, the plurality of first protruding edges 410 of the first edge blade 400 may protrude from a rim surface formed to face the main wheel 700 among the rim surfaces of the ring gear 500.

The plurality of first protruding edges 410 of the first edge blade 400 may repeatedly protrude while having the predetermined width D2 and the predetermined spaced distance D3 along the formation direction of the rim surface, that is, the circumferential direction of the ring gear 500. In this case, as described above, the diameter of the ring gear 500 may be provided as a length obtained by subtracting twice the length of the main spaced distance D1 from the ground surface of the main blade 200 from the length of the diameter of the main wheel 700.

Therefore, in order for the plurality of second protruding edges 310 of the second edge blade 300 to be formed to correspond to the plurality of first protruding edges 410 of the first edge blade 400, the plurality of second protruding edges 310 may protrude along a circumference having a radius equal to a length of a radius of the ring gear 500 from the rotation center of the main wheel 700 among inner surfaces of the main wheel 700.

Because the plurality of second protruding edges 310 of the second edge blade 300 is formed to correspond to the plurality of first protruding edges 410 of the first edge blade 400, the plurality of second protruding edges 310 may repeatedly protrude while having the same predetermined width D3 and predetermined spaced distance D2 as the plurality of first protruding edges 410. Details of the shape and arrangement of the plurality of second protruding edges 310, and a structural relationship between the plurality of second protruding edges 310 and the plurality of first protruding edges 410 will be described later.

Referring to FIGS. 3 and 4, the edge cutting structure 10 may further include the sun gear, the planetary gear 800, and a planetary gear box 900 formed on the main wheel driving shaft 610. Hereinafter, assuming that the entire shape of the main wheel driving shaft 610 is formed of a sun gear, the main wheel driving shaft and the sun gear will be referred to as the same configuration and described.

The main wheel driving shaft 610 may be provided in order to directly transmit the driving force generated from the first motor 600 to the main wheel 700. The main wheel driving shaft 610 may be inserted into the main wheel driving shaft insertion groove 710 in order to directly transmit the driving force generated from the first motor 600 to the main wheel 700.

In order for the main wheel driving shaft 610 not only to directly transmit the driving force generated from the first motor 600 to the main wheel 700 but also to transmit the driving force to the first edge blade 400, that is, to the ring gear 500, a sun gear may be formed on the main wheel driving shaft 610.

As illustrated in FIGS. 3 and 4, the entire shape of the main wheel driving shaft 610 may be formed as a sun gear. Unlike this, only a portion that is engaged with the planetary gear 800 may be formed as a sun gear.

The planetary gear 800 may be disposed between the sun gear formed on the main wheel driving shaft 610 and the internal gear of the ring gear 500. The planetary gear 800 may rotate while being simultaneously engaged with the sun gear and the internal gear of the ring gear 500.

The planetary gear 800 may reduce a high number of rotations of the main wheel driving shaft 610 and transmit the reduced number of rotations to the ring gear 500 of the first edge blade 400. That is, the planetary gear 800 may reduce the high number of rotations of the main wheel driving shaft 610 and increase a torque of the ring gear 500.

In order for the second edge blade 300 to cut the grass in the second region 102 through the relative rotational motion with the first edge blade 400 described above, the planetary gear 800 needs to be provided to be rotatable in place. The relative rotational motion means that the second edge blade 300 and the first edge blade 400 rotate in opposite directions.

In order for the planetary gear 800 to be rotatable in place, the planetary gear 800 may be provided with a planetary gear shaft 810 extending from the planetary gear 800 and the planetary gear box 900 to which the planetary gear shaft 810 is rotatably coupled.

Referring to FIGS. 3 and 4, the planetary gear box 900 may be formed inside the body frame 100. A planetary gear fixing groove 910 formed on the planetary gear box 900, and the planetary gear shaft 810 extending from the planetary gear 800 is inserted into the planetary gear fixing groove 910, whereby the planetary gear 800 may be rotatable in place.

In the robot lawnmower 1 according to an embodiment of the disclosure, one of the planetary gear 800 is provided, but a plurality of the planetary gears 800 may be provided.

Figure 5:
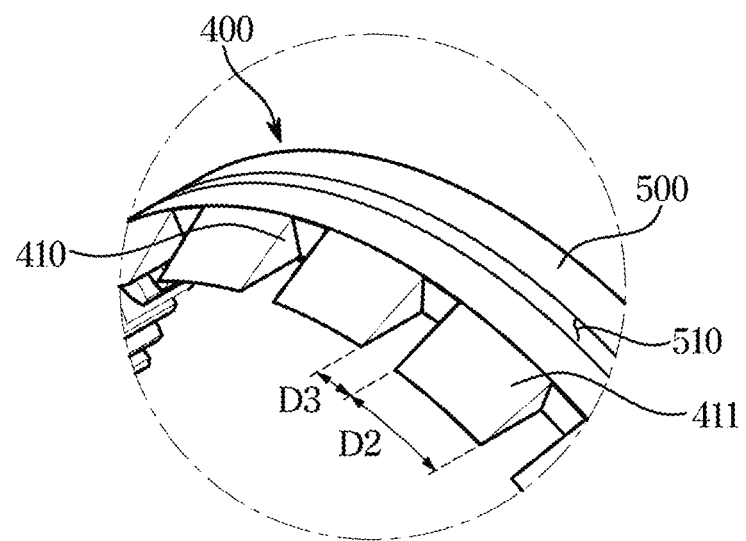
FIG. 5 is a partially enlarged view of a first edge blade formed on a main wheel of the robot lawnmower according to an embodiment in region B in FIG. 4.
Figure 6:
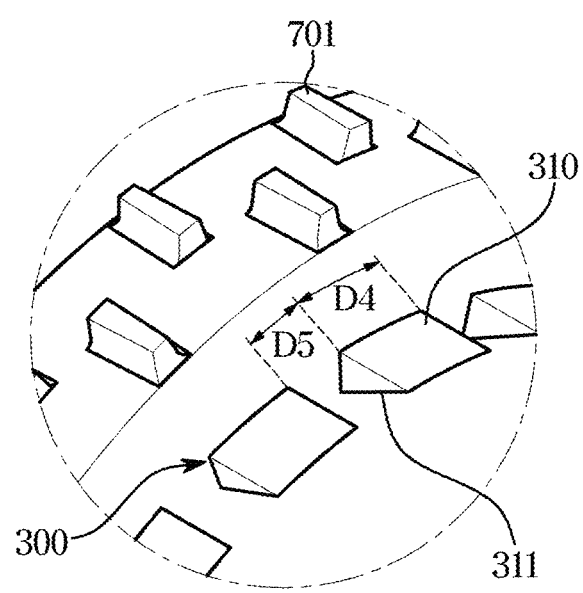
FIG. 6 is a partially enlarged view of a second edge blade and a ring gear of the robot lawnmower according to an embodiment in region A in FIG. 3.
Figure 7:
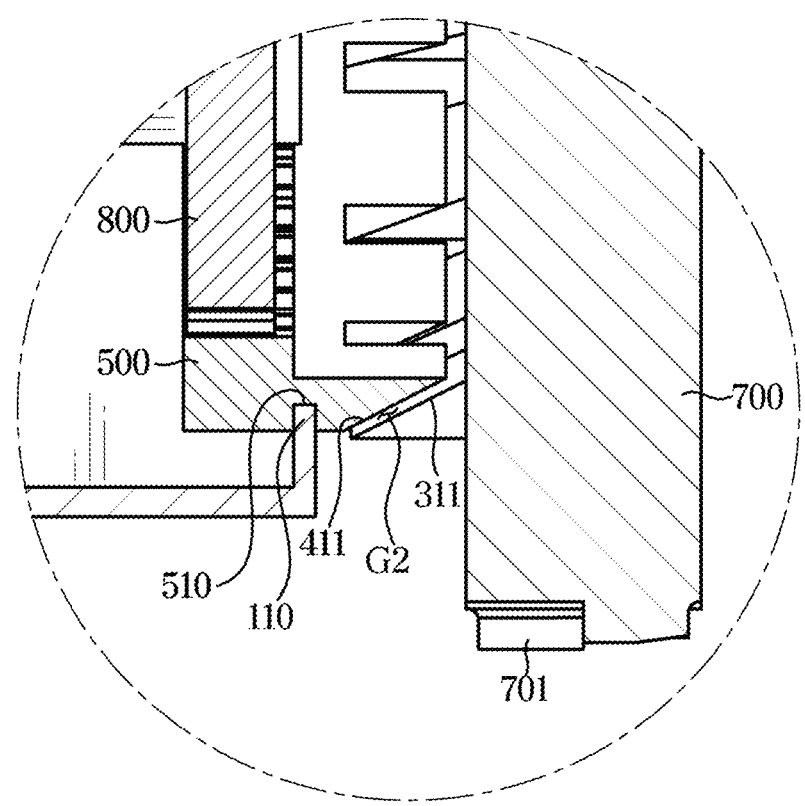
FIG. 7 is a partially enlarged view of a partial region in a cross section taken along line Y-Y in FIG. 2.

FIG. 5 is a partially enlarged view of the first edge blade 400 formed on the main wheel 700 of the robot lawnmower 1 according to an embodiment in region B in FIG. 4, FIG. 6 is a partially enlarged view of the second edge blade 300 and the ring gear 500 of the robot lawnmower 1 according to an embodiment in region A in FIG. 3, and FIG. 7 is a partially enlarged view of a partial region in a cross section taken along line Y-Y in FIG. 2. Hereinafter, the shape and arrangement of the first edge blade 400 and the second edge blade 300, more specifically, the plurality of first protruding edges 410 and the plurality of second protruding edges 310 will be described with reference to FIGS. 5 to 7.

The plurality of first protruding edges 410 of the first edge blade 400 may repeatedly protrude while having a predetermined width and a predetermined spaced distance along the formation direction of the rim surface of the ring gear 500, that is, the circumferential direction of the ring gear 500. Also, the plurality of second protruding edges 310 of the second edge blade 300 may be formed to correspond to the plurality of first protruding edges 410 of the first edge blade 400, and may protrude along a circumference having a radius equal to the length of the radius of the ring gear 500 from the rotation center of the main wheel 700 among the inner surfaces of the main wheel 700.

In this case, a direction in which the plurality of first protruding edges 410 of the first edge blade 400 and the plurality of second protruding edges 310 of the second edge blade 300 protrude may be a direction substantially parallel to the rotation shaft of the main wheel 700.

Because the plurality of second protruding edges 310 of the second edge blade 300 is formed to correspond to the plurality of first protruding edges 410 of the first edge blade 400, the plurality of second protruding edges 310 may repeatedly protrude and may form an insertion gap G1 while having the same predetermined width and predetermined spaced distance as the plurality of first protruding edges 410. Details of the insertion gap G1 will be described later.

Referring to FIGS. 5 and 7, the plurality of first protruding edges 410 of the first edge blade 400 may have a cross section formed in a right triangle. The plurality of first protruding edges 410 may be formed such that the cross section of the right triangle extends along the formation direction of the rim surface of the ring gear 500, that is, the circumferential direction of the ring gear 500.

A length in which the cross section of the right triangle of the plurality of first protruding edges 410 extends along the circumferential direction of the ring gear 500 may be defined as the first protruding edge width D2. Also, a spaced distance between the plurality of first protruding edges 410 may be defined as the first spaced distance D3. A length of the base among the cross section of the right triangle of the plurality of first protruding edges 410 in contact with the rim surface of the ring gear 500 may be formed to have the same size as a predetermined thickness of the ring gear 500.

Referring to FIGS. 6 and 7, a cross section of the plurality of second protruding edges 310 of the second edge blade 300 may be formed in a right triangle. Because the plurality of second protruding edges 310 is formed to correspond to the plurality of first protruding edges 410, the cross section of the right triangle may extend along the formation direction of the rim surface of the ring gear 500, that is, the circumferential direction of the ring gear 500. Alternatively, based on the inner surface of the main wheel 700, the cross section of the right triangle may protrude along a circumference having a radius substantially equal to the length of the radius of the ring gear 500 from the rotation center of the main wheel 700 on the inner surface of the main wheel 700. A length in which the cross section of the right triangle of the plurality of second protruding edges 310 extends along the circumferential direction of the ring gear 500 may be defined as the first protruding edge width D4. Also, a spaced distance between the plurality of second protruding edges 310 may be defined as a second spaced distance D5.

Referring to FIGS. 5 to 7, each of the plurality of first protruding edges 410 may include a first inclined surface 411. Each of the plurality of second protruding edges 310 may include a second inclined surface 311. The second inclined surface 311 may be formed to face and be spaced apart from the first inclined surface 411. That is, a cross section in a state where the first inclined surface 411 of the one first protruding edge and the second inclined surface 311 of the one second protruding edge face each other may have a shape in which a gap G2 is formed along a diagonal line of a substantially rectangular cross section.

FIG. 7 illustrates that the plurality of first protruding edges 410 of the first edge blade 400 is positioned above the gap G2 formed along the diagonal line of a substantially rectangular cross section, but unlike this, the plurality of first protruding edges 410 may be positioned below. That is, FIG. 7 illustrates a form in which the plurality of second protruding edges 310 of the second edge blade 300 surrounds the plurality of first protruding edges 410 of the first edge blade 400, but contrary to the above, the gap G2 may be formed along a diagonal line other than the diagonal line illustrated in FIG. 7 so that the plurality of first protruding edges 410 of the first edge blade 400 surrounds the plurality of second protruding edges 310 of the second edge blade 300.

When the first inclined surface 411 of the plurality of first protruding edges 410 is provided to be in contact with the second inclined surface 311 of the plurality of second protruding edges 310, the above-described gap may not be formed. However, when provided to be in contact with each other, the plurality of first protruding edges 410 and the plurality of second protruding edges 310 may be damaged due to a high-speed relative rotational motion. Therefore, the predetermined gap G2 (hereinafter, inclined surface gap) may be formed between the first inclined surface 411 of the plurality of first protruding edges 410 and the second inclined surface 311 of the plurality of second protruding edges 310.

As described above, the plurality of first protruding edges 410 and the plurality of second protruding edges 310 are each provided to have a cross section of a right triangle, and the first inclined surface 411 and the second inclined surface 311 may be formed to face each other with the inclined surface gap G2 to form a rectangular cross section as a whole, but the cross section of each of the protruding edges is not limited to a right triangle. When the plurality of first protruding edges 410 and the plurality of second protruding edges 310 may each include the first inclined surface 411 and the second inclined surface 311 and each of the inclined surfaces may be formed to face each other with the inclined surface gap G2, various shapes may be provided in consideration of the stress generated in the plurality of first protruding edges 410 and the plurality of second protruding edges 310.

Figure 8:
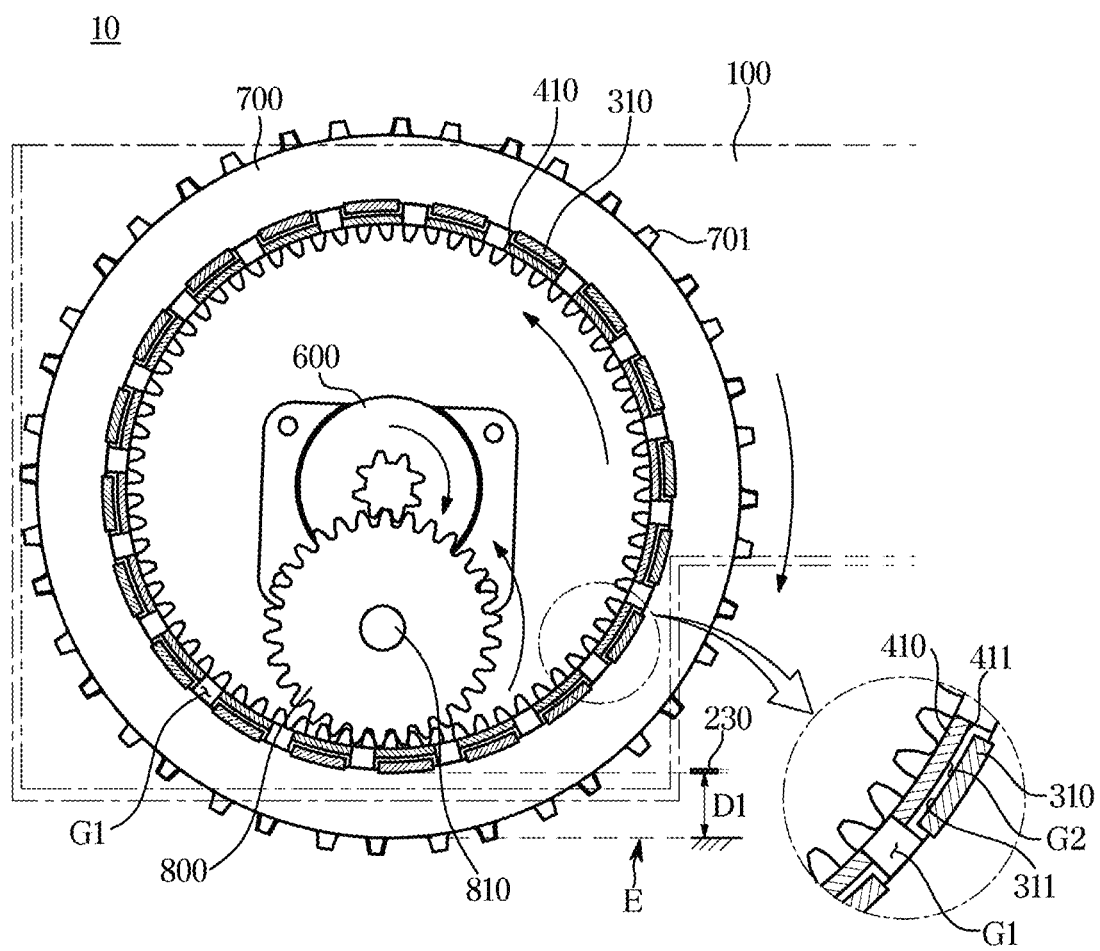
FIG. 8 is a cross-sectional view taken along line X-X in FIG. 1 in a state in which an insertion gap is open.
Figure 9:
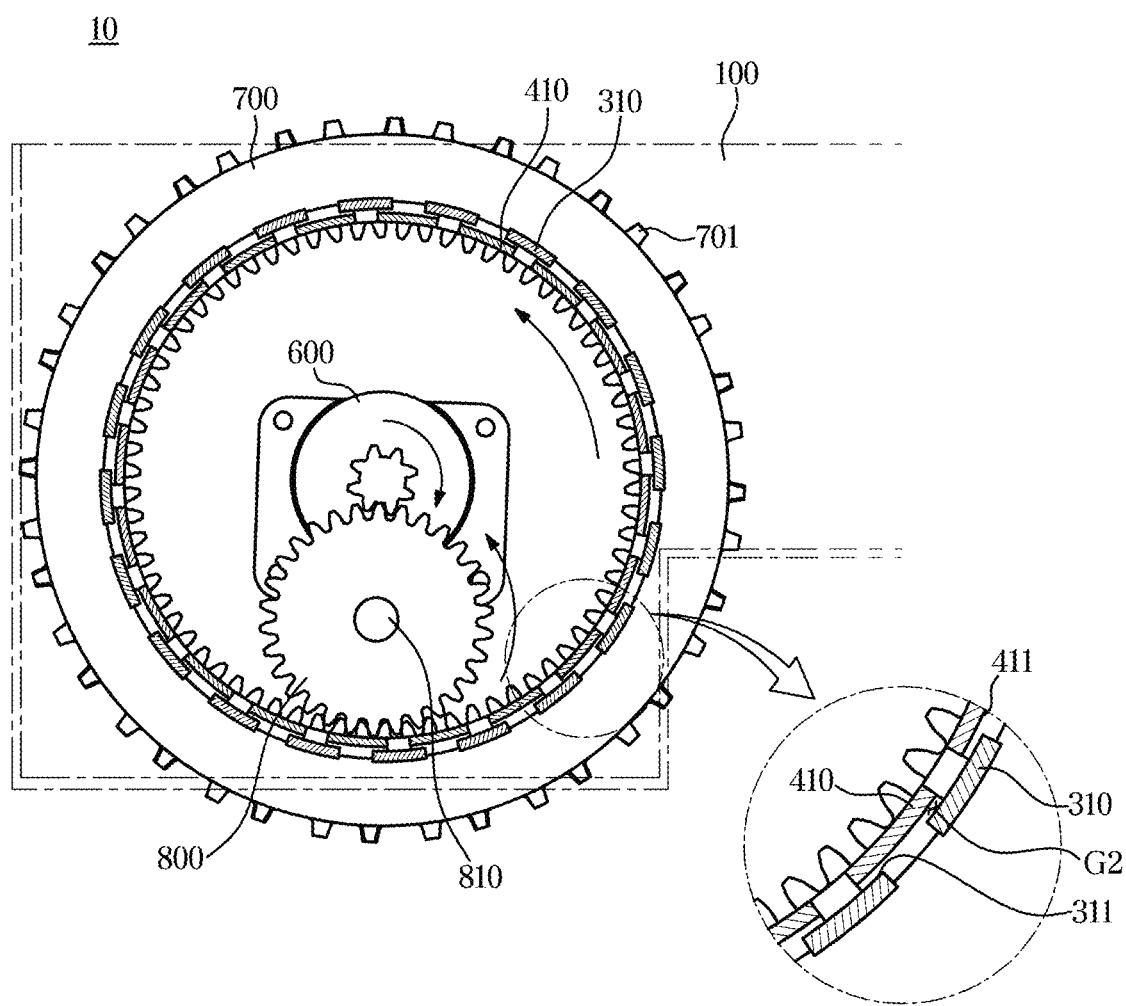
FIG. 9 is a cross-sectional view taken along line X-X in FIG. 1 in a state in which the insertion gap is closed.

FIG. 8 is a cross-sectional view taken along line X-X in FIG. 1 in a state in which the insertion gap G1 is open, and FIG. 9 is a cross-sectional view taken along line X-X in FIG. 1 in a state in which the insertion gap G1 is closed.

Hereinafter, the insertion gap G1 formed by the plurality of first protruding edges 410 of the first edge blade 400 and the plurality of second protruding edges 310 of the second edge blade 300 in order to cut the grass in the second region 102 will be described.

As described above, because the plurality of second protruding edges 310 of the second edge blade 300 is formed to correspond to the plurality of first protruding edges 410 of the first edge blade 400, the plurality of second protruding edges 310 may repeatedly protrude while having the same predetermined width and predetermined spaced distance as the plurality of first protruding edges 410.

A specific meaning of "formed to correspond" is as follows.

In order to cut the grass in the second region 102 by a relative rotational motion between the plurality of first protruding edges 410 of the first edge blade 400 and the plurality of second protruding edges 310 of the second edge blade 300, the gap G1 (hereinafter referred to as insertion gap) into which the grass in the second region 102 is inserted may be formed.

A grass may be cut by the relative rotational motion between the plurality of first protruding edges 410 of the first edge blade 400 and the plurality of second protruding edges 310 of the second edge blade 300 performed after the grass is inserted into the insertion gap G1. Therefore, the insertion gap G1 may be provided as a structure in which opening and closing are repeated depending on the relative rotational motion between the plurality of first protruding edges 410 of the first edge blade 400 and the plurality of second protruding edges 310 of the second edge blade 300.

Accordingly, a width and a spaced distance between the plurality of first protruding edges 410 of the first edge blade 400 and the plurality of second protruding edges 310 of the second edge blade 300 need to be formed such that each of the protruding edges may be utilized evenly. Therefore, the first protruding edge width D5 of the plurality of first protruding edges 410 and the second protruding edge width D3 of the plurality of second protruding edges 310 may be formed to have the same size. In addition, the first spaced distance D4 of the plurality of first protruding edges 410 and the second spaced distance D2 of the plurality of second protruding edges 310 may be formed to be the same.

The width of the protruding edge and the spaced distance between the protruding edges need to be formed equally so that a uniform fatigue load may act on the plurality of first protruding edges 410 of the first edge blade 400 and the plurality of second protruding edges 310 of the second edge blade 300. Through this structure, durability and a stable cutting structure of the first and second edge blades 400 and 300 may be secured. However, the first edge blade 400 and the second edge blade 300 are not limited to the above-described shape, but may be provided in various shapes that may ensure distribution of a uniform fatigue load and a stable cutting structure.

Figure 11:
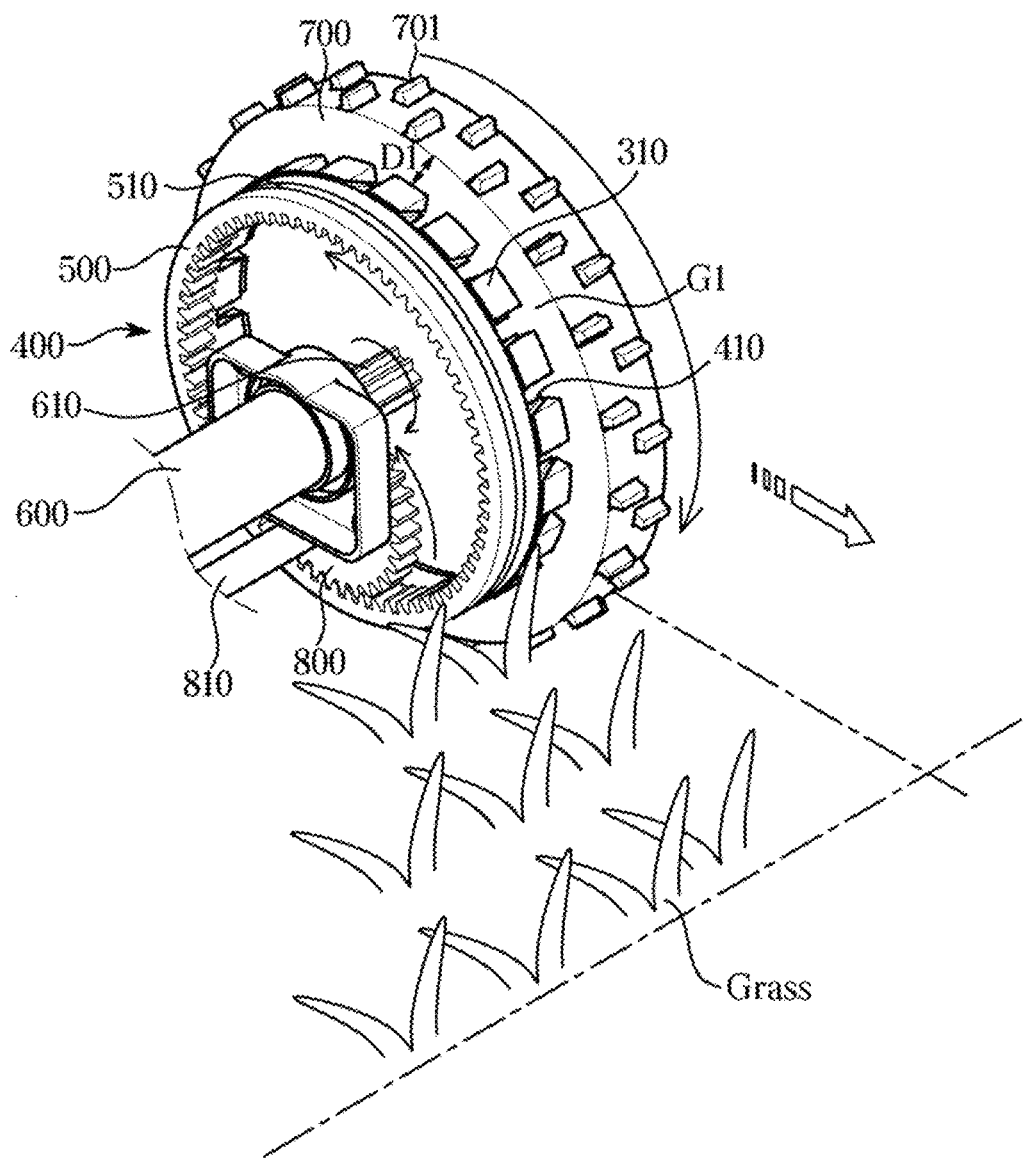
FIG. 11 is a perspective view illustrating a driving state of the edge cutting structure of the robot lawnmower according to an embodiment with the body frame removed.

FIG. 10 is a cross-sectional view of line Y-Y in FIG. 2, and FIG. 11 is a perspective view illustrating a driving state of the edge cutting structure 10 of the robot lawnmower 1 according to an embodiment with the body frame 100 removed.

Hereinafter, an operation structure of the edge cutting structure 10 will be described in detail with reference to FIGS. 10 and 11.

A process in which the driving force generated by the first motor 600 is transmitted to the second edge blade 300 will be described with reference to arrow F1 in FIG. 10. In the case of the second edge blade 300, because the main wheel 700 is connected to the main wheel driving shaft 610, the driving force may be directly transmitted from the second motor 210.

A process in which the driving force generated by the first motor 600 is transmitted to the first edge blade 400 will be described with reference to arrow F2 in FIG. 10. The driving force generated by the first motor 600 is transmitted to the main wheel driving shaft 610. Thereafter, the driving force is transmitted to the planetary gear 800 through the sun gear formed on the main wheel driving shaft 610. At this time, the planetary gear shaft 810 of the planetary gear 800 is rotated in place by being connected to the planetary gear fixing groove 910 (see FIG. 3) of the planetary gear box 900 (see FIG. 3) integrally formed with or coupled to the body frame 100. The driving force transmitted to the planetary gear 800 is transmitted to the ring gear 500 so that the first edge blade 400 is finally rotated with respect to the body frame 100.

The ring gear 500 and the sun gear each rotate, and may also rotate in opposite directions. Specifically, the sun gear formed on the main wheel driving shaft 610 may be provided as a driving gear, the ring gear 500 may be provided as a driven gear, and the planetary gear 800 may be provided as a gear fixed by the planetary gear box 900. Through this structure, the ring gear 500 rotates in a direction opposite to the sun gear and may be decelerated compared to the rotational speed of the sun gear.

Because the ring gear 500 and the sun gear each rotate and also rotate in the opposite direction, the plurality of first protruding edges 410 of the first edge blade 400 and the plurality of second protruding edges 310 of the second edge blade 300 have a structure in which the insertion gap G1 is repeatedly opened and closed depending on a relative rotational motion. Due to this, compared to a structure in which only one of the first edge blade 400 and the second edge blade 300 may be rotated, a period in which the insertion gap G1 is repeatedly opened and closed is shorter, so that the grass cutting operation may be carried out quickly.

As is apparent from the above, a robot lawnmower with an improved structure capable of simultaneously cutting a grass in edge regions located on both sides of a main cut region can be provided.

Further, a robot lawnmower having an improved structure capable of cutting a grass in an edge region formed between a lawnmower body and a main wheel by utilizing the lawnmower body and the main wheel can be provided.

Further, a robot lawnmower capable of generating a relative rotational motion between a main wheel and a ring gear provided to be rotatable in a lawnmower body by utilizing a driving force of a motor driving the main wheel and capable of cutting a grass in an edge region by an edge blade formed on each of a ring gear and a main wheel can be provided.

The foregoing has illustrated and described specific embodiments. However, it should be understood by those of skilled in the art that the disclosure is not limited to the above-described embodiments, and various changes and modifications may be made without departing from the technical idea of the disclosure described in the following claims.

What is claimed is:

1. A robot lawnmower comprising:
a body frame;
a main wheel disposed on both sides of the body frame;
a motor to drive the main wheel;
a first edge blade provided in a region of the body frame corresponding to the main wheel and coupled to be rotatable in a rotational direction opposite of a rotational direction of the main wheel with respect to the body frame by way of a driving force received from the motor; and
a second edge blade disposed between the body frame and the main wheel to rotate in an identical rotational direction of the rotational direction of the main wheel and cut grass by a relative rotation of the first edge blade and the main wheel, wherein the relative rotation of the first edge blade is a rotational motion opposite of a rotational motion of the second edge blade.

2. The robot lawnmower of claim 1, wherein the first edge blade comprises a ring gear rotatable with respect to the body frame.

3. The robot lawnmower of claim 2, wherein the ring gear comprises a ring gear groove formed on an outer circumferential surface thereof, and the body frame comprises a mounting part coupled to the ring gear groove and configured to rotatably support the ring gear.

4. The robot lawnmower of claim 2, wherein
the motor is further configured to rotate a main wheel driving shaft to connect the motor and rotate the main wheel,
wherein a sun gear is formed on an outer circumferential surface of the main wheel driving shaft.

5. The robot lawnmower of claim 4, further comprising a planetary gear engaged between the sun gear and the ring gear to rotate.

6. The robot lawnmower of claim 5, wherein the ring gear and the main wheel rotate in opposite directions.

7. The robot lawnmower of claim 5, further comprising a planetary gear box formed inside of the body frame and to which a planetary gear rotation shaft extending from the planetary gear is rotatably coupled.

8. The robot lawnmower of claim 2, wherein the first edge blade comprises a plurality of first protruding edges protruding from a rim of the ring gear toward the main wheel.

9. The robot lawnmower of claim 8, wherein the second edge blade comprises a plurality of second protruding edges formed along a rim of the main wheel to correspond to the first edge blade and protruding from an inner rim of the main wheel toward the body frame.

10. The robot lawnmower of claim 9, wherein the plurality of first protruding edges and the plurality of second protruding edges protrude in a direction parallel to a rotation shaft of the main wheel.

11. The robot lawnmower of claim 8, wherein each of the plurality of first protruding edges comprises a first inclined surface.

12. The robot lawnmower of claim 11, wherein each of a plurality of second protruding edges comprises a second inclined surface spaced apart from and facing the first inclined surface.

13. The robot lawnmower of claim 12, wherein:
the plurality of first protruding edges is formed to be spaced apart from each other along the rim of the ring gear, and
the plurality of second protruding edges each corresponds to the plurality of first protruding edges and is formed to be spaced apart from each other along the rim of the main wheel.

14. The robot lawnmower of claim 1, wherein:
the main wheel comprises a plurality of main wheels disposed on both sides of the body frame,
the robot lawnmower further comprises a main blade disposed between the plurality of main wheels and rotatably provided on a bottom of the body frame, and a second motor fixed to the body frame configured to rotate the main blade, and
the main blade comprises a rotating plate coupled to the second motor and configured to rotate, and a plurality of blades protruding from a rim of the rotating plate.

15. The robot lawnmower of claim 14, comprising:
a first region in which grass is cut by the main blade; and
a second region adjacent to both sides of the first region and in which grass is cut by the first edge blade and the second edge blade.

16. A robot lawnmower comprising:
a body frame on which a main wheel is disposed on both sides thereof;
a first edge blade comprising a plurality of first protruding edges protruding from the body frame toward the main wheel and configured to be rotatable in a rotational direction opposite a rotational direction of the main wheel; and
a second edge blade formed along a rim of the main wheel and comprising a plurality of second protruding edges protruding from the main wheel toward the body frame to correspond to the first edge blade and configured to be rotatable in an identical rotational direction of the rotational direction of the main wheel.

17. The robot lawnmower of claim 16, wherein:
the first edge blade comprises a ring gear rotatable with respect to the body frame,
the plurality of first protruding edges protruding from a rim of the ring gear,
the ring gear comprises a ring gear groove formed on an outer circumferential surface thereof, and
the body frame comprises a mounting part coupled to the ring gear groove configured to rotatably support the ring gear.

18. The robot lawnmower of claim 17, wherein:
the plurality of first protruding edges is each spaced apart from each other to be disposed along the rim of the ring gear and each comprises a first inclined surface, and
the plurality of second protruding edges is spaced apart from each other to correspond to the plurality of first protruding edges and to be disposed along the rim of the main wheel, and each comprises a second inclined surface spaced apart from and facing the first inclined surface.

19. The robot lawnmower of claim 18, further comprising:
a motor configured to rotate the main wheel;
a main wheel driving shaft connecting the motor and the main wheel and comprising a sun gear formed on an outer circumferential surface thereof; and
a planetary gear engaged between the main wheel driving shaft and the ring gear to rotate.

20. The robot lawnmower of claim 19, further comprising a planetary gear box formed inside of the body frame so that the ring gear and the main wheel rotate in opposite directions and to which a planetary gear rotation shaft extending from the planetary gear is rotatably coupled.

* * * * *